United States Patent
Disser et al.

(10) Patent No.: US 6,407,528 B1
(45) Date of Patent: *Jun. 18, 2002

(54) LOW COST BRUSH MOTOR DRIVER IN CONJUNCTION WITH LOW COST SR MOTOR DRIVER

(75) Inventors: Robert John Disser, Dayton; Patrick Allen Mescher, Bellbrook, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/735,418

(22) Filed: Dec. 12, 2000

Related U.S. Application Data

(60) Provisional application No. 60/170,558, filed on Dec. 14, 1999.

(51) Int. Cl.[7] .................................................. H02P 5/28
(52) U.S. Cl. ......................... 318/701; 318/254; 307/24
(58) Field of Search ................................ 318/701, 254, 318/439, 138, 685, 696; 307/24, 34, 38

(56) References Cited

U.S. PATENT DOCUMENTS

| | | | |
|---|---|---|---|
| 4,271,380 A | 6/1981 | Bradler et al. | |
| 4,835,408 A | * 5/1989 | Ray et al. | ..................... 307/24 |
| 5,115,181 A | 5/1992 | Sood | |
| 5,289,107 A | 2/1994 | Radun et al. | |
| 5,352,965 A | 10/1994 | Kawabata | |
| 5,689,164 A | 11/1997 | Hoft et al. | |
| 5,900,712 A | 5/1999 | Disser et al. | |
| 5,962,997 A | 10/1999 | Maisch | |

* cited by examiner

*Primary Examiner*—Khanh Dang
(74) *Attorney, Agent, or Firm*—Scott A. McBain

(57) ABSTRACT

A combined drive circuit for a split brake system of a motor vehicle has a switched reluctance motor and a brush motor. The switched reluctance motor has multiple phase windings. The combined drive circuit includes a DC power source with first and second supply buses. A SR motor driver supplies current to the switched reluctance motor. The SR motor driver has a first capacitor coupled to the phase windings for storing energy from the phase windings and a second capacitor coupled to the first capacitor and a third supply bus, thereby developing a third supply bus voltage across the second capacitor. A brush motor driver is coupled to the first and second capacitor. The SR motor driver is adapted to supply current to the brush motor. The brush motor driver has a first switching element and a second switching element coupled to the brush motor.

22 Claims, 3 Drawing Sheets

LOW COST BRUSH MOTOR DRIVER IN CONJUNCTION WITH LOW COST SR MOTOR DRIVER

CROSS-REFERENCE TO RELATED APPLICATIONS

This application claims the benefit of U.S. Provisional Patent Application Serial No. 60/170,558, filed Dec. 14, 1999.

BACKGROUND OF THE INVENTION

1. Field of the Invention

The present invention relates generally to electric motors and, more particularly, to a combined driver circuit for a brush motor and a switched reluctance motor.

2. Background of the Invention

Electric motors are used in a variety of applications. Two types of electric motors are brush motors and switched reluctance motors. Each has different operating characteristics and therefore, advantages suitable for different applications.

For example, a split brake system for a motor vehicle typically controls a front and diagonally opposed rear brake. The front brake requires high response performance and the rear brake requires significantly reduced response performance. Thus, a brush motor is used to actuate the rear brake and a switched reluctance motor is used to actuate the front brake.

With regard to the switched reluctance motor, the drive circuit is comprised of power switching devices and diodes for sequentially energizing the motor phase windings in accordance with the position of the rotor to produce a rotating magnetic field that interacts with the rotor poles to produce torque of a desired direction and magnitude.

A number of drive circuit topologies have been proposed to minimize the number of power devices in an effort to reduce the cost of the driver circuit. One such topology is described in U.S. Pat. No. 4,835,408 issued to Ray et al. The circuit disclosed in Ray, commonly referred to as a split-link circuit, utilizes capacitors to establish an intermediate voltage bus. One or more of the phase windings are coupled to the intermediate voltage bus. In automobile applications, the supply voltage is typically 12 volts. Such a design reduces the number of power devices required, but only one half of the supply voltage is available for energizing the phase windings. As a result, the efficiency of the drive is reduced due to increased switching and conduction losses.

U.S. Pat. No. 5,900,712 issued to Disser et al, maintains a second bus at a voltage which is either higher or lower than the supply voltage, thereby extending the voltage range of the supply.

With regard to the brush motor, motor direction is controlled by the polarity of the voltage applied to the brush terminals. Since it is desirable to maximize power to the brake, it is desirable to apply full supply voltage to the brush terminals.

The applied voltage can be reversed by two methods. In the first method, a conventional "H-bridge" four FET transistor configuration utilizes a single power supply. By controlling the commutation logic of the transistors, two diagonally opposite transistors are used to apply voltage in one direction while the other two diagonally opposite transistors are used to apply voltage in the other direction. The second method uses two power supplies. The use of four power devices in the first method and the second power supply adds cost to the system.

The present invention is aimed at one or more of the problems above.

BRIEF SUMMARY OF THE INVENTION

In one aspect of the present invention, a combined drive circuit for a switched reluctance motor and a brush motor is provided. The switched reluctance motor has multiple phase windings. The combined drive circuit includes a DC power source with first and second supply buses. A SR motor driver supplies current to the switched reluctance motor. The SR motor driver has a first capacitor coupled to the first and second supply buses for storing energy from DC power supply and a second capacitor coupled to the first capacitor and a third supply bus, thereby developing a third supply bus voltage across the second capacitor. A brush motor driver is coupled to the first and second capacitor. The SR motor driver is adapted to supply current to the brush motor. The brush motor driver has a first switching element and a second switching element coupled to the brush motor.

In another aspect of the present invention, a combined drive circuit for a split brake system of a motor vehicle is provided. The split brake system has a switched reluctance motor and a brush motor. The switched reluctance motor has multiple phase windings. The combined drive circuit includes a DC power source with first and second supply buses. A SR motor driver supplies current to the switched reluctance motor. The SR motor driver has a first capacitor coupled to the first and second supply buses for storing energy from the DC power source and a second capacitor coupled to the first capacitor and a third supply bus, thereby developing a third supply bus voltage across the second capacitor. A brush motor driver is coupled to the first and second capacitor. The SR motor driver is adapted to supply current to the brush motor. The brush motor driver has a first switching element and a second switching element coupled to the brush motor.

DETAILED DESCRIPTION OF THE INVENTION

Figure 1:
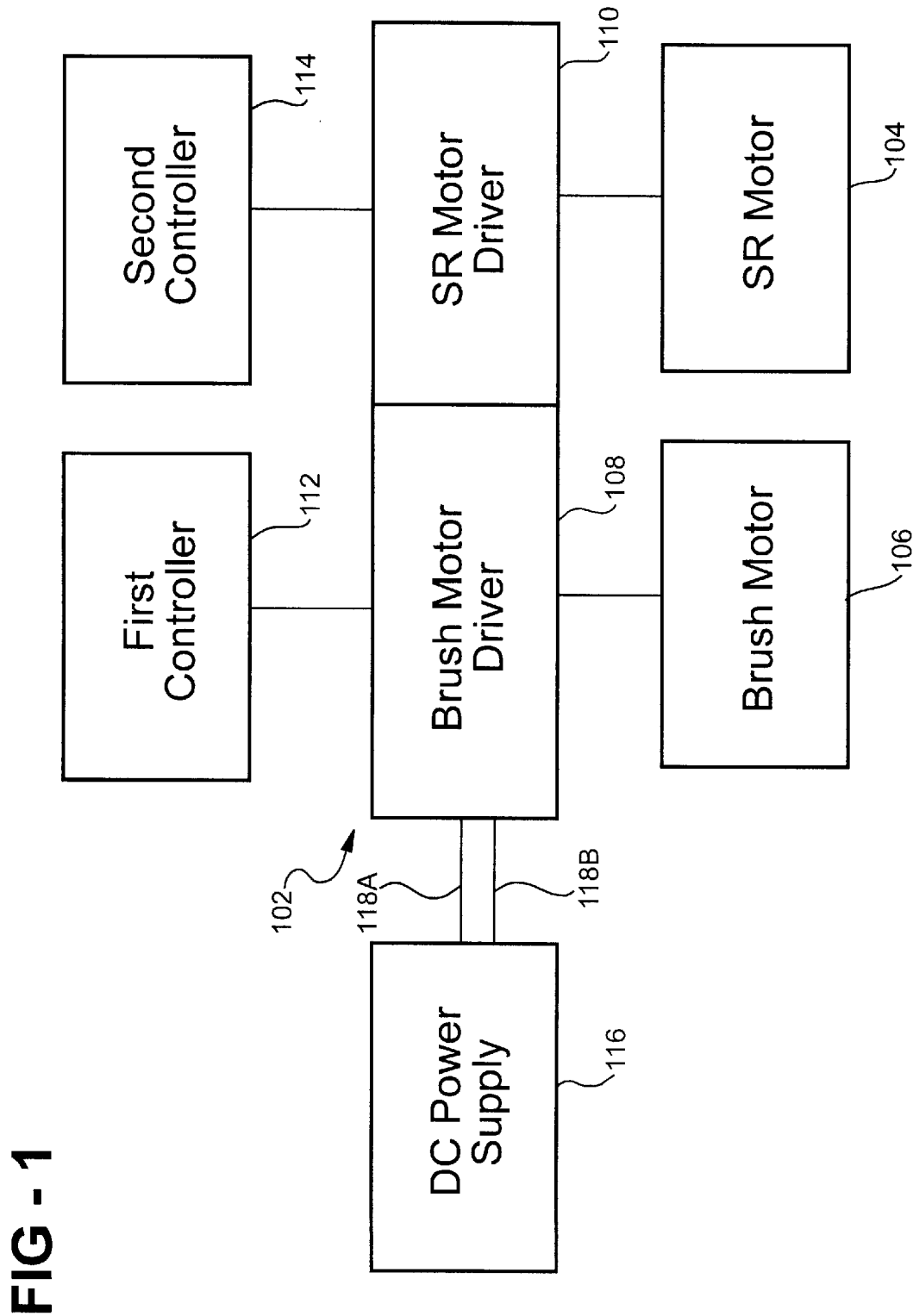
FIG. 1 is a block diagram of a combined drive circuit for a brush motor and a switched reluctance motor.
Figure 2:
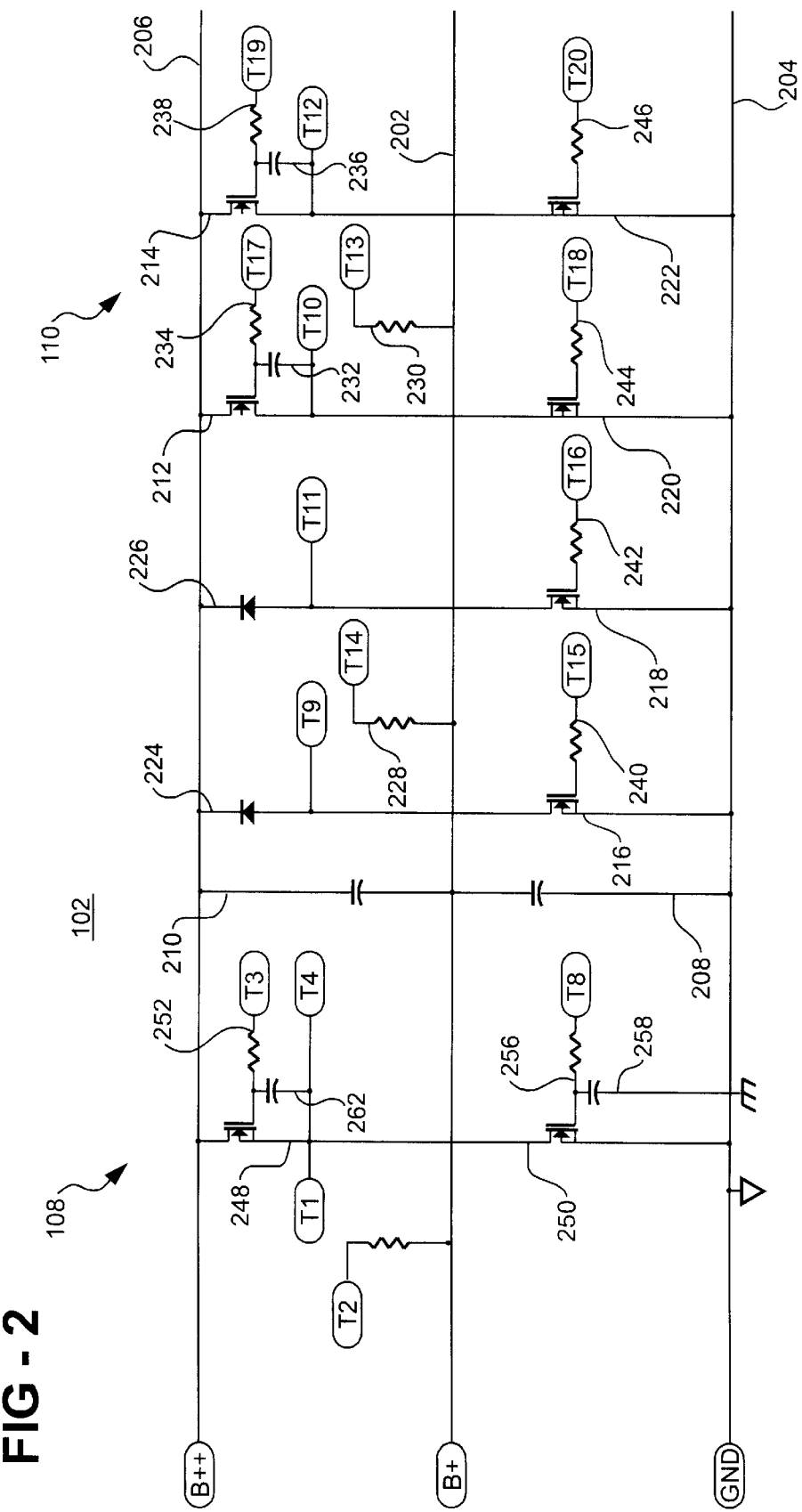
FIG. 2 is a schematic of the combined drive circuit of FIG. 1, according to an embodiment of the present invention.

With reference to FIGS. 1 and 2, the present invention provides a combined drive circuit 102 for a switched reluctance (SR) motor 104 and a brush motor 106. The switched reluctance motor 106 includes multiple phase windings (see below). A DC power source 116 supplies power to the combined drive circuit 102. The combined drive circuit 102 includes a brush motor driver 108 and a switched reluctance (SR) motor driver 110. First and second controllers 112, 114 apply control signals to the brush and SR drivers 108, 110 to control the current supplied to the respective motor 106, 104. In the preferred embodiment, the control signals are pulse width modulated (PWM) signals. The generation of such PWM signals and the control of brush motors and SR motors are well known in the art, and thus, is not further discussed.

A DC power supply 116 supplies power to the brush motor 106 and the SR motor 104 through the respective driver 108, 110. The DC power supply 116, which may be a battery, such as a conventional automotive storage battery, or a source of rectified AC, is connected to the combined driver circuit 102 at first and second supply terminals 118A, 118B.

With reference to FIG. 2, the first supply terminal 118A defines a first supply bus 202 and the second supply terminal 118B defines a second supply bus 204. The combined driver circuit 102 includes a third supply bus 206, as described below.

Figure 4:
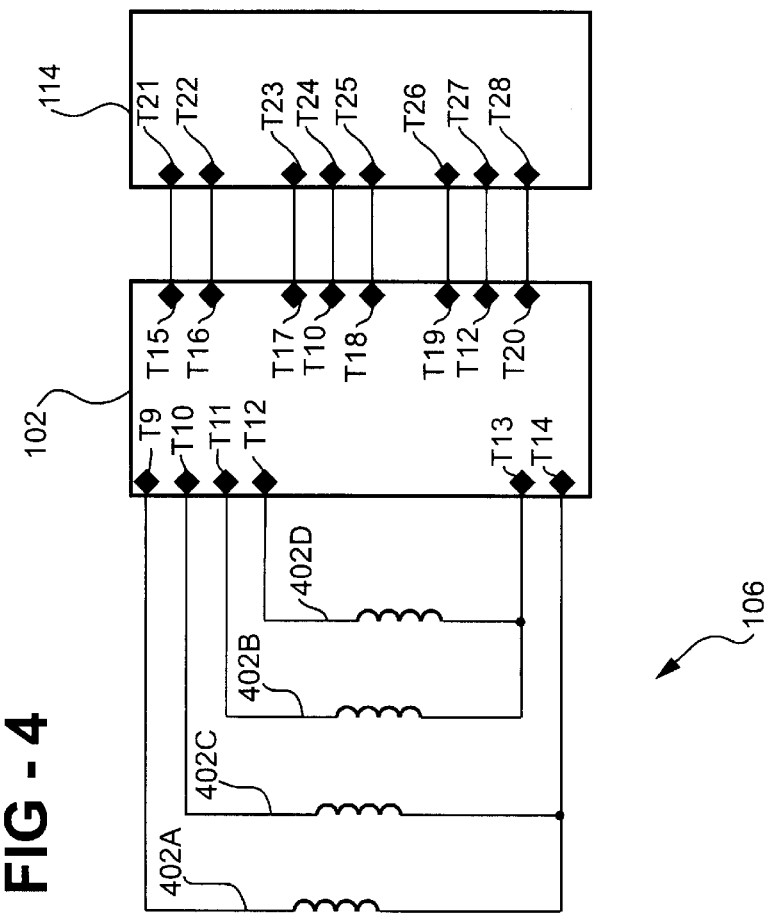
Figure 3:
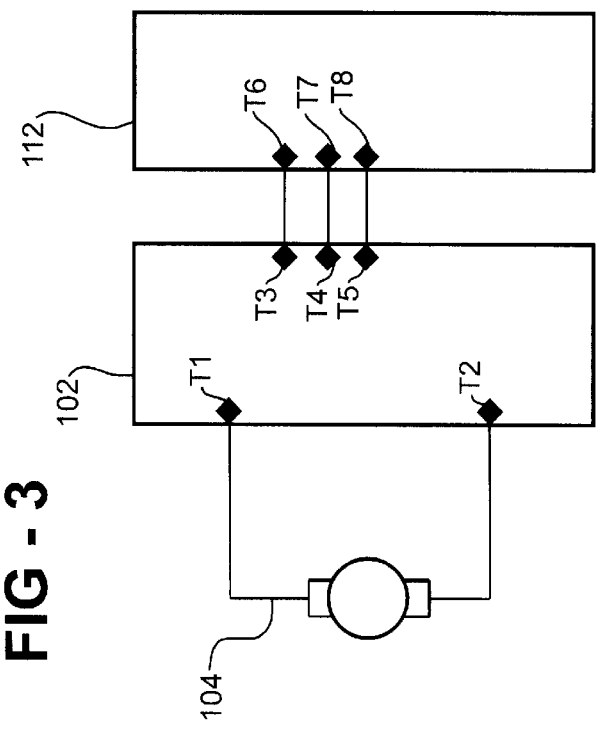
FIG. 3 is a block diagram illustrating connections between the combined drive circuit and the brush motor of FIG. 1; and, FIG. 4 is a block diagram illustrating connections between the combined drive circuit and the switched reluctance motor of FIG. 1.

With reference to FIGS. 3 and 4, the combined driver circuit 102 includes first and second terminals, T1, T2. The brush motor 104 is coupled to the combined driver circuit 102 at the first and second terminals, T1, T2. The combined driver circuit 102 also includes third, fourth and fifth terminals, T3, T4, T5. The first controller 112 includes sixth, seventh, and eighth terminals T6, T7, T8. The combined driver circuit 102 is coupled to the first controller 112 via the third through eighth terminals, T3, T4, T5, T6, T7, T8, as shown.

The combined driver circuit 102 also includes ninth, tenth, eleventh, twelfth, thirteenth, and fourteenth terminals, T9, T10, T11, T12, T13, T14. The SR motor 106 preferably includes first, second, third, and fourth phase windings 402A, 402C, 402B, 402D. The first phase winding 402A is connected at a first end of the ninth terminal T9 and at a second end to the fourteenth terminal T14. The second phase winding 402B is connected at a first end to the eleventh terminal T11 and at a second end to the thirteenth terminal T13. The third phase winding 402C is connected at a first end to the tenth terminal T10 and at a second end to the fourteenth terminal T14. The fourth phase winding 402D is connected at a first end to the twelfth terminal T12 and at a second end to the thirteenth terminal T13.

The combined circuit driver 102 also includes fifteenth, sixteenth, seventeenth, eighteenth, nineteenth, and twentieth terminals, T15, T16, T17, T18, T19, T20. The second controller 114 includes twenty-first, twenty-second, twenty-third, twenty-fourth, twenty-fifth, twenty-sixth, twenty-seventh, and twenty-eighth terminals, T21, T22, T23, T24, T25, T26, T27, T28. The combined driver circuit 102 is coupled to the second controller 114 via the fifteenth through twenty-eighth terminals, T15, T16, T17, T18, T19, T21, T22, T23, T24, T25, T26, T27, T28 and the tenth and twelfth terminals T10, T12, as shown.

Returning to FIG. 2, the SR motor driver 110 includes a first capacitor 208 coupled to the first and second supply buses and a second capacitor 210 coupled to the first capacitor 208 and the third supply bus 206. The second capacitor 210 is also coupled to the first, second, third, and fourth phase windings 402A, 402B, 402C, 402D, developing a third supply bus, B++ or two times the battery voltage of B+. The SR motor driver 110 includes first, second, third, fourth, fifth and sixth power transistors 212, 214,216, 218, 220, 222 and first and second free-wheeling diodes 224, 226.

The first and second power transistors and the first and second free-wheeling diodes 224, 226, 212, 214, direct inductive currents stored in the respective phase windings 402A, 402B, 402C, 402D to one of the capacitors 208, 210, or to another of the phase windings 402A, 402B, 402C, 402D being energized.

The fourteenth terminal T14 is coupled to the first supply bus 202 by a first resistor 228. The thirteenth terminal T13 is coupled to the first supply bus 202 by a second resistor 230. The tenth and seventeenth terminals T10, T17 are coupled to the first power transistor 212 by a third capacitor 232 and third resistor 234, respectively. The twelfth and nineteenth terminals T12, T19 are coupled to the second power transistor 214 by a fourth capacitor 236 and a fourth resistor 238, respectively.

The fifteenth terminal T15 is coupled to the third power transistor 216 by a fifth resistor 240. The sixteenth terminal T16 is coupled to the fourth power transistor 218 by a sixth resistor 242. The eighteenth terminal T18 is coupled to the fourth power transistor 220 by a seventh resistor 244. The twentieth terminal T20 is coupled to the sixth power transistor 222 by a eighth resistor 246.

The second controller 114 generates a pulse-width modulated (PWM) signal in order to control the SR motor 104 via the SR motor driver 110. Such a system is disclosed in U.S. Pat. No. 5,900,712 issued May 4, 1999 to Robert J. Disser, et al (Disser), which is hereby incorporated by reference. While the SR motor driver 110 described above generates a supply voltage above the DC power supply voltage 116, the driver 110 could be adapted to generate a supply voltage having a negative magnitude of B−. Such a circuit is also described in Disser. Other embodiments of the SR motor driver 110 are disclosed in Disser all of which fall under the scope of the present invention.

The brush motor driver 108 is coupled to the SR motor driver 110. By providing a third supply bus 206, the brush motor 106 can be driven bi-directionally using the second voltage supply generated by the SR motor driver 108 using a 2 switch brush motor driver configuration.

The brush motor driver 108 is coupled to the first and second capacitor 208, 210 of the SR motor driver 110. The brush motor driver 110 is adapted to supply current to the brush motor 106. The brush motor driver 110 includes a first switching element or power FET transistor 248 and a second switching element 250 coupled to the brush motor 106.

The first switching element 248 is coupled to the third terminal T3 by a ninth resistor 252 and a fifth capacitor 254. The second switching element 250 is coupled to the fifth terminal T5 by a tenth resistor 256 and to the second supply bus 204 by a sixth capacitor 258.

The first controller 112 uses conventional PWM control techniques to control both motor current and motor voltage to achieve desired motor performance.

The brush motor 106 operates between ground (the second supply bus 204) and the power supply voltage , B+ (the first supply voltage), controlled by the second switch device 250 in the forward direction. The brush motor 106 operates between the power supply voltage, B+ and the third supply bus voltage, B++, controlled by the first switching device 248 in the reverse direction. This provides two independent power supplies and independent control switches to operate the brush motor 106 using bi-directional control.

In an application where motor load is not equal, e.g., brake caliper apply vs. brake caliper release, the direction with the higher load should be connected between B+ and ground, since this is the main twelve volt automotive battery. The direction with the lighter load should be connected between B+ and B++ since this supply is generated by the SR motor driver 110.

In summary, the present invention provides a combined switched reluctance motor brush motor driver circuit 102, while minimizing the number of power devices. Driver circuit 102 generates a supply voltages, thereby extending the range of the power supply without suffering the performance losses of prior circuits.

With this invention has been described in reference to the illustrated embodiment, it will be understood that various modifications and design variations will occur to those skilled in the art, and that drive circuits and controls incorporating such modifications may fall within the scope of this invention, which is defined by the appended claims.

What is claimed is:

1. A combined drive circuit for a switched reluctance motor and a brush motor, the switched reluctance motor having multiple phase windings, comprising:
   a DC power source having a first terminal defining a first supply bus and a second terminal defining a second supply bus, each of the phase windings having a first end connected to the first supply bus and a second end;
   a third supply bus;
   a SR motor driver for supplying current to the switched reluctance motor, the SR motor driver having a first capacitor coupled to the phase windings for storing energy from the phase windings and a second capacitor coupled to the first capacitor and the third supply bus, thereby developing a third supply bus voltage across the second capacitor; and,
   a brush motor driver being coupled to the first and second capacitor, the SR motor driver being adapted to supply current to the brush motor, the brush motor driver having a first switching element and a second switching element coupled to the brush motor.

2. The combined drive circuit, as set forth in claim 1, wherein the third supply bus voltage is greater than the DC power source.

3. The combined drive circuit, as set forth in claim 1, wherein the third supply bus voltage is negative.

4. The combined drive circuit, as set forth in claim 1, including first and second diodes coupled to the first and second capacitors.

5. The combined drive circuit, as set forth in claim 4, wherein the first and second diodes are adapted to direct inductive currents stored in a respective phase windings to one of the first and second capacitors and another of the phase windings.

6. The combined drive circuit, as set forth in claim 1, including first and second power transistors and first and second diodes being coupled to the first and second capacitors.

7. The combined drive circuit, as set forth in claim 6, wherein the first and second power transistors and the first and second diodes and are adapted to direct inductive currents stored in a respective phase windings to one of the first and second capacitors and another of the phase windings.

8. The combined drive circuit, as set forth in claim 7, includes third and fourth power transistors, wherein the third and fourth power transistors and the first and second diodes are adapted to direct inductive currents stored in respective phase windings to one of the first and second capacitors and another of the phase windings.

9. The combined drive circuit, as set forth in claim 1, including a first controller for supplying a pulse width modulated signal to the brush motor driver for controlling motor voltage and motor current to achieve desired motor performance.

10. The combined drive circuit, as set forth in claim 9, wherein the first controller is adapted to control the brush motor bi-directionally in first and second directions.

11. The combined drive circuit, as set forth in claim 10, wherein the brush motor has higher load in a first direction and wherein the brush motor is driven by the DC power supply in the first direction.

12. A combined drive circuit for a split brake system of a motor vehicle, having a switched reluctance motor and a brush motor, the switched reluctance motor having multiple phase windings, comprising:
   a DC power source having a first terminal defining a first supply bus and a second terminal defining a supply bus, each of the phase windings having a first end connected to the first supply bus and a second end;
   a third supply bus;
   a SR motor driver for supplying current to the switched reluctance motor, the SR motor driver having a first capacitor coupled to the phase windings for storing energy from the phase windings and a second capacitor coupled to the first capacitor and the third supply bus, thereby developing a third supply bus voltage across the second capacitor; and,
   a brush motor driver being coupled to the first and second capacitor, the SR motor driver being adapted to supply current to the brush motor, the brush motor driver having a first switching element and a second switching element coupled to the brush motor.

13. The combined drive circuit, as set forth in claim 12, wherein the third supply bus voltage is greater than the DC power source.

14. The combined drive circuit, as set forth in claim 12, wherein the third supply bus voltage is negative.

15. The combined drive circuit, as set forth in claim 12, including first and second diodes coupled to the first and second capacitors.

16. The combined drive circuit, as set forth in claim 15, wherein the first and second diodes are adapted to direct inductive currents stored in a respective phase windings to one of the first and second capacitors and another of the phase windings.

17. The combined drive circuit, as set forth in claim 12, including first and second power transistors and first and second diodes being coupled to the first and second capacitors.

18. The combined drive circuit, as set forth in claim 17, wherein the first and second power transistors and the first and second diodes and are adapted to direct inductive currents stored in a respective phase windings to one of the first and second capacitors and another of the phase windings.

19. The combined drive circuit, as set forth in claim 18, includes third and fourth power transistors, wherein the third and fourth power transistors and the first and second diodes are adapted to direct inductive currents stored in respective phase windings to one of the first and second capacitors and another of the phase windings.

20. The combined drive circuit, as set forth in claim 12, including a first controller for supplying a pulse width modulated signal to the brush motor driver for controlling motor voltage and motor current to achieve desired motor performance.

21. The combined drive circuit, as set forth in claim 20, wherein the first controller is adapted to control the brush motor bi-directionally in first and second directions.

22. The combined drive circuit, as set forth in claim 21, wherein the brush motor has higher load in a first direction and wherein the brush motor is driven by the DC power supply in the first direction.

* * * * *